June 16, 1931.  J. W. LEDOUX  1,810,141

LIQUID METER

Filed Aug. 4, 1921

INVENTOR
John W. Ledoux
BY
Butler + Denny
ATTORNEYS

Patented June 16, 1931

1,810,141

UNITED STATES PATENT OFFICE

JOHN W. LEDOUX, OF SWARTHMORE, PENNSYLVANIA, ASSIGNOR, BY MESNE ASSIGNMENTS, TO SIMPLEX VALVE & METER COMPANY, OF PHILADELPHIA, PENNSYLVANIA, A CORPORATION OF DELAWARE

LIQUID METER

Application filed August 4, 1921. Serial No. 489,757.

This invention is an improved differential pressure liquid meter for operating a pointer, a register or a recorder in functional relation to changes in the flow to be measured, and its primary object is to provide a simple, efficient and accurate mechanism adapted for operating a pointer, recorder and register for showing respectively the rate or velocity of flow at a given time, the rate or velocity of total flow at any time within a certain period, and the total flow over a given period.

The characteristic features of my invention are set out in the following description and the accompanying drawings in illustration thereof.

Figure 2:
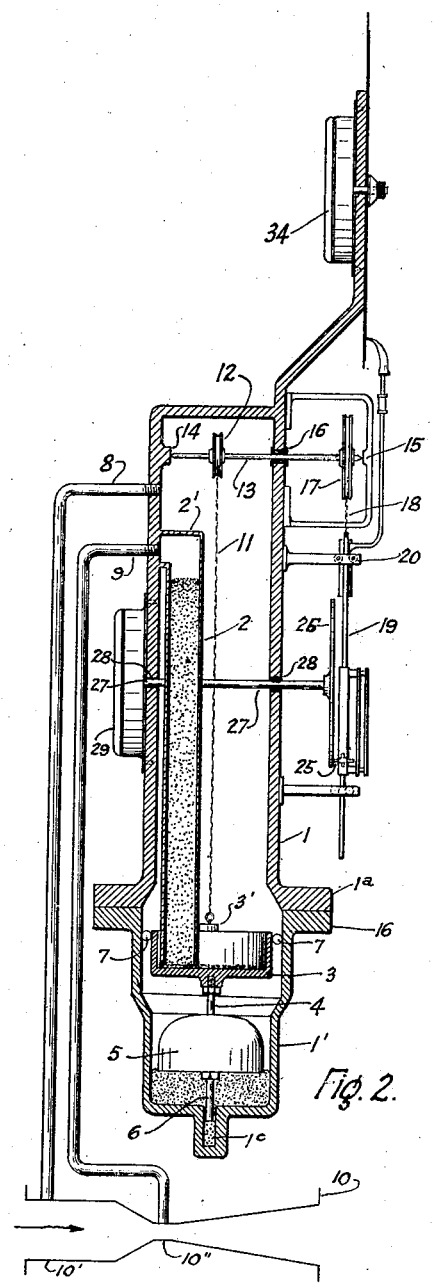
Figure 1:
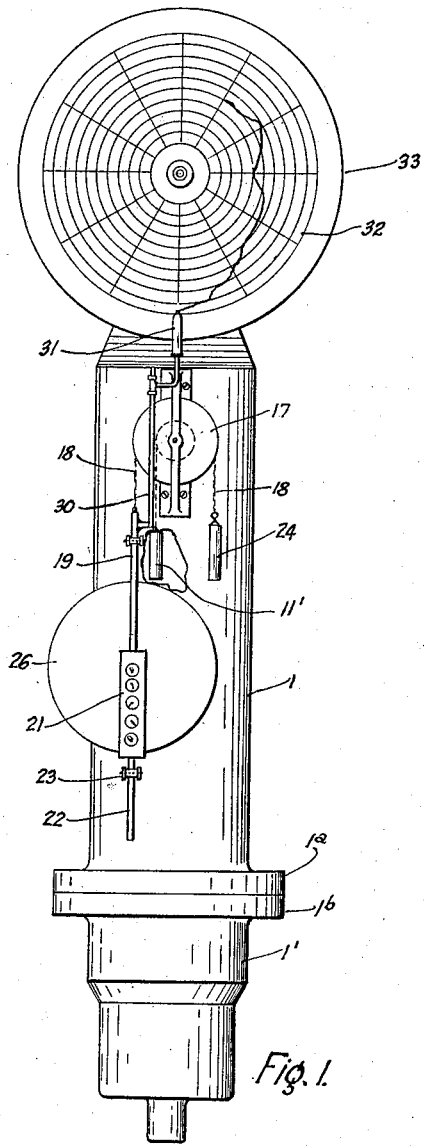

In the drawings, Fig. 1 is a front elevation of mechanism embodying my improvements with a fragment of the casing broken away, and Fig. 2 is a vertical sectional view through the instrument shown in Fig. 1, at right angles thereto, when applied to a conduit, shown diagrammatically.

The mechanism embodying the invention, in the form illustrated, comprises a metal case having the top and bottom sections 1 and 1' connected by the respective transverse flanges 1a and 1b.

The upper section 1 of the case contains the depending tube 2 having the angle 2' at its top fixed within the section near its top. The bottom section 1' contains the cup 3 fixed by the stem 4 to the apex of a mathematically shaped float 5 which is provided with a depending stem 6 that is movable in the guideway 1c formed in the bottom of the section 1', rollers 7 between the periphery of the cup 3 and the section 1' guiding the cup which moves vertically with the float.

The tube 2 has its lower end disposed in the cup 3 and sealed by mercury, and the float 5 is buoyed by mercury in the bottom of the section 1' to counterbalance the load transmitted from the cup.

Tubes 8 and 9 connect the interior of the section 1, at its top, within and without the tube 2, with the conduit 10, the tube 8 being connected with a normal section 10' and the tube 9 with a contracted section 10''.

A cable 11 connects the bar 3' fixed to the top of the cup 3 and the sheave 12 revoluble in the top of the section 1 with its supporting shaft 13 having the pivotal bearings 14 and 15 within and without the section 1 respectively, the shaft being provided with the packing 16 where it passes through the wall of the case. The sheave 17, fixed on the shaft 13 exterior to the case, is connected by a cable 18 with the guide bar 19 which moves vertically in the anti-friction bearing 20 and supports the counter or register 21. The latter has the depending guide bar 22 which moves vertically in the anti-friction bearing 23. A counter weight 24 is fixed to the cable 18 on the opposite side of the sheave 17 from the bar 19.

The register 21 is operated by a traction wheel 25 which is carried thereby and movable between the center and periphery of the vertical disk 26. This disk is fixed on a shaft 27 which extends through the section 1 and is journalled in the packed bearings 28 thereof, the shaft being revolved at a constant rate by a clock 29 fixed to the exterior of the case.

A rod 30 is fixed to the rod 19 and carries a pen 31. The latter is movable vertically and radially with reference to a chart 32 on a recorder disk 33 operated at a constant rate by a clock 34, thus serving as a pointer to indicate the rate at a given time as well as to make a record over a given period.

In operation, when there is no flow of the liquid in the conduit 10, the pressures communicated from the sections 10' and 10'' through the tubes 8 and 9 are equal, at which time the pressures of the liquids upon the surfaces of the mercury in the tube 2 and cup 3 are equal. The mercury then stands at the same level in the cup 3 and the tube 2, the cup 3 and float 5 being in their lowest positions due to the fact that the cup or vessel 3 contains the maximum amount of mercury, whose weight forces the float 5 down to the maximum submergence in the mercury in the chamber 1' so that the surface of the mercury in this chamber is approximately tangent to the top of the float.

When liquid flows through the conduit 10, the pressure at the section 10' is greater than at the section 10″, the difference in pressure increasing with the increase in velocity of flow in the conduit 10, with the result that the pressure upon the mercury in the cup 3 exterior to the tube 2 is greater than the pressure within the tube. Hence, mercury in the cup 3 is caused to rise in the tube 2 until the weight of the column of mercury in the tube 2, plus the pressure above the mercury in such tube, equals the pressure in the casing 1, 1′. As the weight of the column of mercury in the tube 2 is supported by this difference of pressure and the cup 3 is thereby relieved of the weight of such mercury, the buoyancy of the float 5 in the mercury in the casing 1′ will cause the float and cup to rise, the movement being in simple functional relation to changes in the rate of flow in the conduit 10 due to the peculiar shape of the float.

The float used in the preferred construction has a surface generated by the revolution of a curve whose general equation is $$y^2 = a - \frac{b}{\sqrt{c+h}}$$

in which $a$, $b$ and $c$ are constants, $h$ represents the abscissas of the float and $y$ the ordinates. The value of the constants depends upon the assumed dimensions of the apparatus, the maximum desired rate of flow, and the relative weights of the heavy and light liquid.

With the flow through the conduit 10 at the maximum, the parts assume the positions shown in the drawings, the float 5 being immersed in the mercury only sufficiently to provide a buoyancy equal to any constant dead weight of the movable parts when there is no mercury in the cup 3. Or such dead weight may be counterbalanced by a counterweight 11′.

The cup and float, in moving, act through the intermediate mechanism described to operate the indicating mechanism, including the pointer, register and recorder, proportionately.

Having described my invention, I claim:

1. A meter comprising a casing, a buoyant member of gradually upwardly decreasing cross sectional area, a buoying liquid in said casing, supporting said buoyant member, a liquid container having a closed bottom and supported by said member, a liquid container communicating with said container first named through the top thereof and supported independently of said member and means for creating several differential pressures from a flowing liquid and communicating one of said pressures to a liquid in one of said containers and another of such differential pressures to liquid in the other of said containers, said buoyant member having a shape effecting movement thereof in simple functional relation to changes in the rate of flow of said flowing liquid.

2. A meter comprising a buoyant member having an upwardly converging outer contour, means comprising a liquid for buoying said member, means comprising a cup and a tube having a free end depending into said cup, said cup and tube containing a liquid supported by and tending to submerge said member in said liquid first named, means for creating differential pressures by the action of a flowing liquid, and means for communicating the respective pressures to the liquid in said cup and tube and varying the amount of said liquid second named supported by said member, said buoyant member having a shape effecting movement thereof in simple functional relation to changes in the rate of flow of said flowing liquid.

3. A meter comprising a buoyant member and a liquid for supporting it, a container for said liquid, means for creating differential pressures by the action of a flowing liquid, means operable by said pressures and varying the submergence of said member in its supporting liquid in simple functional relation to changes in the rate of flow of said flowing liquid, a plurality of rotatable disks, a register, means for operating said disks, means connecting said register with said member and having a traction wheel movable thereby toward and from the axis of one of said disks, an indicator and recorder, and means connecting said indicator and recorder with said member, said indicator and recorder being movable by said member toward and from the axis of the other of said disks.

4. A meter comprising a container, liquid in said container, a buoyant member supported by said liquid, a cup supported by said buoyant member and containing a liquid, a tube depending into said cup and adapted for the reception of liquid from said cup, means for causing differential pressures to vary the volume of liquid in said cup, said buoyant member tapering upwardly and varying in its submergence in said liquid in simple functional relation to changes in differential pressures aforesaid, and means in operative relation with said cup for registering the movement thereof.

5. A meter comprising a casing, a buoyant member of gradually upwardly decreasing cross sectional area, a buoying fluid in said casing supporting said member, a fluid container supported by said member, a container having a free end depending into said container first named and supported independently of said member and means for creating several differential pressures from a flowing fluid and communicating one of said pressures to a fluid in one of said containers and another of such differential pressures to fluid in the other of said containers, said buoyant member having a shape effecting movement thereof in simple functional relation to changes in the rate of flow of said flowing fluid.

6. A meter comprising a buoyant member having an upwardly converging outer contour, means comprising a fluid for buoying said member, means comprising a cup and a tube depending thereinto and containing a fluid supported by and tending to submerge said member in said fluid first named, means for creating differential pressures by the action of a flowing fluid, and means for communicating the respective pressures to the opposite ends of the fluid in said cup and tube and varying the amount of said fluid second named supported by said member, said buoyant member having a shape effecting movement thereof in simple functional relation to changes in the rate of flow of said flowing fluid.

7. A meter comprising a buoyant member and a fluid for supporting it, a container for said fluid, means for creating differential pressures by the action of a flowing fluid, means operable by said pressures and varying the submergence of said member in its supporting fluid in simple functional relation to changes in the rate of flow of said flowing fluid, a plurality of rotatable disks, a register, means for operating said disks, means connecting said register with said member and having a traction wheel movable thereby toward and from the axis of one of said disks, an indicator and recorder, and means connecting said indicator and recorder with said member, said indicator and recorder being movable by said member toward and from the axis of the other of said disks.

In testimony whereof I have hereunto set my name this first day of August, 1921.

JOHN W. LEDOUX.